July 14, 1970  R. J. DODSON  3,520,165
METHOD OF TREATING WELDED TUBING
Filed Oct. 27, 1967
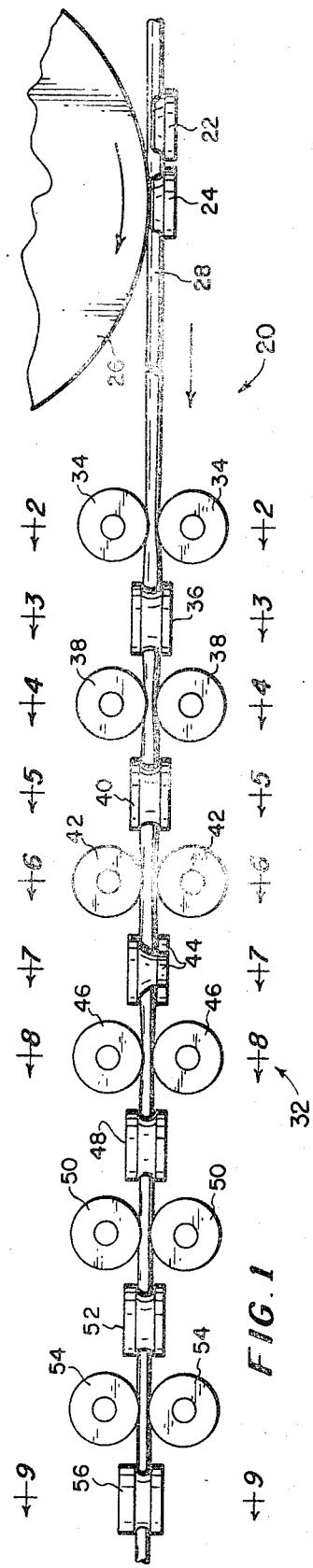
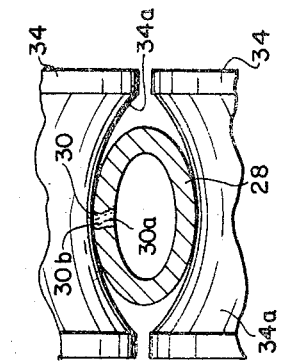
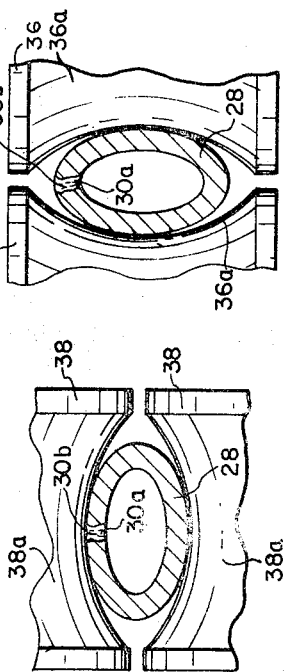
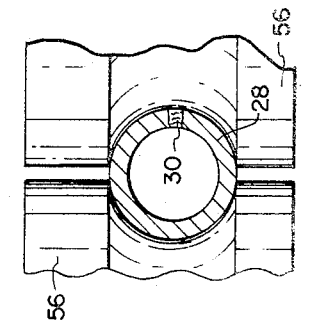
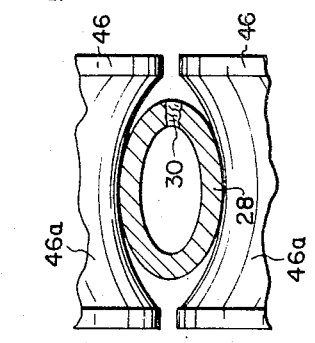
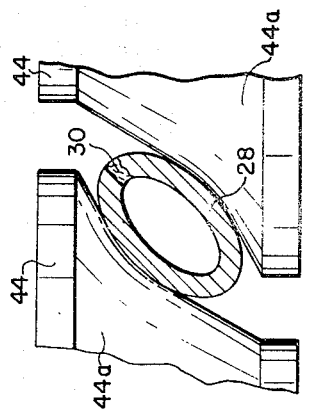
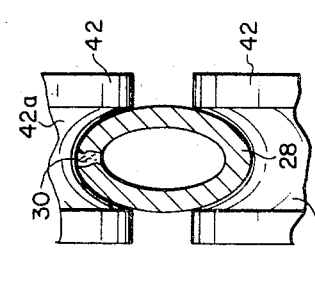
INVENTOR:
RICHARD J. DODSON
By Mason, Kolehmainen,
Rathburn & Wyss
Attys.

![United States Patent Office]

3,520,165
Patented July 14, 1970

3,520,165
METHOD OF TREATING WELDED TUBING
Richard J. Dodson, Evanston, Ill., assignor to Clayton Mark & Company, Evanston, Ill., a corporation of Delaware
Filed Oct. 27, 1967, Ser. No. 678,650
Int. Cl. B21b *17/00*
U.S. Cl. 72—64                                      8 Claims

ABSTRACT OF THE DISCLOSURE

Tubing having a butt welded seam is distorted and worked by finishing rolls on the tube mill in order to open up otherwise undetectible faults and defects in the weld. Sequential pairs of rolls compress the tubing into oval shapes in which the major diameter alternately intersects the seam and is transverse to the seam. Other rolls abruptly twist the tubing to apply a shear stress to the entire extent of the weld.

---

The present invention relates to the process of manufacturing welded tubing, and more particularly to a method of revealing hidden or incipient defects in welded tubing and particularly in the welded seam.

In the production of welded tubing, a flat strip or web of metal is advanced from a roll through a tube mill in which the strip is continuously formed into a cylindrical tube, usually of circular cross section. Upon entering the mill, the tubing passes through a series of forming rolls where it is shaped into a substantially circular cylindrical shape with the edges of the strip abutting one another. The edges of the strip are then butt welded together at a welding station including suitable welding electrode means. Conventionally, the welded tubing, after being cooled, passes through a series of finishing or sizing rolls which impart to the tubing its final size and shape. After the tubing is removed from the mill, it may be cut into sections of a desired length and tested by conventional eddy-current or gas testing techniques in order to locate portions of the tubing having faulty or incomplete welded seams.

This known manufacturing process produces welded tubing which is entirely satisfactory for many applications. However, in some cases the welded tubing is severely worked or distorted during subsequent manufacturing processes. In such cases the severe working of the tube can aggravate and open defective portions of the tube and the butt welded seam which cannot be detected by conventional detecting techniques. Such failure of a tube after the tube is incorporated into expensive apparatus, for example, results in expensive rejects and waste.

Accordingly, it is an important object of the present invention to provide an improved process for manufacturing tubing.

Another object of the invention is to provide a method of manufacturing tubing including a novel method for revealing hidden and incipient defects in tubing.

A further object of the invention is to provide a method with which hidden defects in the tube are revealed so that they can easily be detected prior to incorporation of the tube into other apparatus.

In brief, one embodiment of the method of the present invention may be carried out in a tube mill in which a web or strip of material is advanced into the mill and shaped into a cylindrical form with its edges abutting one another. The abutting edges of the strip are butt welded together to form a substantially circular cylindrical tube having a longitudinal butt welded seam.

In accordance with the present invention, the finishing rolls of the machine are designed materially to distort and work the tubing as it moves through the finishing rolls thereby to stress the butt weld and reveal or open hidden or incipient defects in the seam. In accordance with one important feature of the invention, the tubing is twisted by the finishing rolls of the machine thereby to subject the butt weld to a shear stress, and open up defective regions of the weld. This may be accomplished by finishing rolls which flatten the tubing to an oval shape, and then twist the oval tubing abruptly before returning it to round.

A further feature of the invention resides in the steps of ovaling the tubing sequentially so that the major diameter of the tube is alternately intersecting and transverse to the seam. Distortion of the tube in this manner, when combined with twisting of the tubing, causes defective portions not ordinarily detectable to open or otherwise reveal themselves so that they may be detected with conventional eddy-current and/or air testing apparatus.

The above and many other objects and advantages of the present invention will appear from the following detailed description of one apparatus capable of performing the method of the present invention, taken with the accompanying drawings, in which:

FIG. 1 is a partly diagrammatic, fragmentary, elevational view of portions of a tube mill adapted to perform the method of the present invention; and FIGS. 2–9 are enlarged sectional views of the tubing taken respectively along the correspondingly numbered lines of FIG. 1, and each figure also illustrates fragmentary, interfacing portions of one set of finishing rolls.

Having reference initially to FIG. 1, there are illustrated portions of a tube mill designated as a whole by the reference numeral 20 and capable of carrying out the present invention. In general, the tube mill 20 performs a continuous process in which a flat strip or web of steel is formed into a cylindrical tube having an elongated butt welded seam. The strip of metal is advanced from a suitable supply through a series of forming rolls (not shown) which sequentially form the strip into a circular cylindrical shape with its edges abutting one another. The strip or web is then advanced between a pair of lead rolls 22 and a pair of pressure rolls 24. An electrode assembly or welding roll 26 engages the abutting faces of the strip edges between the pressure rolls 24 and welds the abutting faces together to form a substantially circular cylindrical tubing 28 having an elongated longitudinal seam 30. After leaving the welding roll 26, the tubing 28 may pass through suitable inside and outside bead trimming apparatus (not shown) where the welded seam 30 is trimmed, and through suitable cooling apparatus such as a water bath (not shown). In addition, the tubing 28 may pass through one or more pairs of holding rolls (not shown) for holding the tubing in position without materially altering its substantially circular cross section.

In the welding of steel tubing, it is possible for the welded seam to be imperfect or defective. This may occur for many reasons, among which are the presence of metallurgical faults such as the inclusion of foreign material or the presence of a lamination at edges of the strip, mechanical damage to the strip edges, dirt, and so forth.

Techniques have been developed for detecting defective portions of the weld, these including measuring the resistance across the welded seam and testing the tube for gas leaks. However, conventional welded tube can have hidden or incipient defects in the seam or elsewhere in the tube which cannot be detected by conventional methods. For example, the weld may be defective in the central portion and appear to be satisfactory from the exterior of the tube. In many uses of welded tubing, such hidden or incipient defects do not give rise to particular problems, but in some cases, especially where the tube is severely worked during the manufacturing process, such incipient defects can be aggravated so that the tube is rendered unsatisfactory.

In accordance with the present invention the welded tubing is distorted in order to stress the butt weld and the body of the tube and cause any hidden or incipient defects or faults to open up or to otherwise reveal themselves so that they can be detected with conventional methods. In the apparatus illustrated in the drawings the novel method of the present invention is carried out with a finishing roll assembly generally designated as 32 of the tube mill 20, although the method could be performed after the tubing is removed from the mill. In the illustrated apparatus finishing rolls on the machine are used for twisting the tubing to subject the weld to shear stress, thereby to open defective portions of the seam. In addition, other rolls are used to oval the tubing in alternate transverse directions.

More specifically, one aspect of the invention resides in compressing the welded tubing into an oval shape thereby to stress the butt welded seam. Although this could be done either before or after the twisting operation, in the illustrated apparatus as the tubing 28 enters the finishing roll assembly 32, it passes between a pair of vertically disposed finishing rolls 34 (FIGS. 1 and 2) which apply a compressive force in a vertical direction to the tubing 28. The rolls 34 include peripheral grooves 34a compressing the moving tubing into an oval shape with its major diameter in a horizontal direction and its minor diameter in a vertical direction or substantially intersecting the butt welded seam 30 disposed at the top of the tubing. Ovaling the tube in this manner serves to compress the outer region 30b of the weld seam 30 and to stretch the inner portion 30a.

The tubing is next stressed in a transverse direction by a pair of finishing rolls 36 disposed in horizontal positions and including large radius grooves 36a, as the tubing advances between the opposed rolls 36 it is compressed in a horizontal direction into an oval shape with its major diameter substantially intersecting the tube welded seam 30. Thus the inner portion 30a of the weld 30 is compressed while the outer portion 30b is stretched. The transverse ovaling operations are repeated by two additional pairs of finishing rolls 38 and 40 having grooves 38a and 40a which compress the tube 28 once again into substantially horizontal and vertical oval shapes. The rolls 38 and 40 are illustrated as being similar respectively to the rolls 34 and 36.

An important feature of the present invention resides in a novel method for stressing the entire width of the butt welded seam 30 including not only the inner and outer portions 30a and 30b but also the central portions. In accordance with this aspect of the present invention, stressing of the weld is accomplished by twisting the tubing thereby to apply to the butt weld a shearing force or stress.

In the apparatus illustrated in the drawings, this novel twisting operation is performed by a series of finishing rolls associated with the tube mill 20. Upon leaving the pair of rolls 40 (FIG. 8) the tubing 28 with the weld 30 at the top is in an oval shape and is disposed in a substantially vertical direction. The tubing is moved between a pair of holding rolls 42 having relatively short radius grooves 42a therein for holding the tubing 28 in its vertically oriented position against the force of subsequent twisting. The tubing is then twisted through 90 degrees by additional pairs of rolls 44 and 46. As appears most clearly in FIG. 7, the rolls 44 include angularly disposed, relatively shallow grooves 44a effective to twist the tube through an angle of approximately 45 degrees. The rolls 46 include grooves 46a for twisting the tube 28 through an additional 45 degrees so that as the tubing moves from the rolls 42 through the rolls 46 it is twisted through an angle of approximately 90 degrees. This twisting action causes shearing forces or shear stresses to occur between the abutting edges of the tube and within the butt welded seam 30. Accordingly, the entire extent of the butt welded seam 30 is subjected to a stress which tends to open or reveal otherwise hidden defects or faults in the weld.

After the tubing passes through the rolls 46, it advances through a series of pairs of finishing or sizing rolls 48, 50, 52, 54 and 56. These rolls are used to return the tube to a round shape and to bring it to the desired size. As illustrated in FIG. 9, when the tube 28 advances from the tube mill 20 through the final set of finishing rolls 56, it is substantially circular in cross section.

After being removed from the tube mill 32, the tubing 28 may either be cut into segments of a desired length or wound into a roll. The tubing then may be subjected to testing in order to locate defective portions of the tube. One known testing technique, for example, is to pressurize the tubing with a gas to discover portions of the tubing in which gas leaks through faulty portions of the weld. Another known method is to measure the resistance across the weld to locate high resistance regions wherein the weld is defective.

After the tubing has been processed in accordance with the present invention by twisting or by twisting and ovaling, defective portions of the butt weld or the body of the tube which ordinarily could not be detected are capable of being detected by conventional techniques. Distortion or working of the tubing in accordance with the invention causes incipient or hidden defects in the weld to become aggravated and enlarged, and to open up to the point where gas leakage from the tubing and/or an increase in resistance across the weld takes place. Tubing which has been treated in accordance with the invention and tested by conventional techniques is capable of being severely worked in subsequent manufacturing processes with a low percentage of failure.

In order for best results to be obtained in the twisting of the tubing, it is believed that the twisting should be done somewhat abruptly rather than gradually. For example, it is believed that if the tubing is twisted through an angle of approximately 90 degrees in a distance of approximately between one and two feet, satisfactory results can be obtained.

Although ovaling of the tubing may be carried out in combination with twisting, and may improve the results to some extent, it is believed that the twisting may be carried out without ovaling. Ovaling of the tube prior to twisting does, however, facilitate the twisting process since a tube of oval cross section can be abruptly twisted more readily than a tube of circular cross section. In order for ovaling to be effective in stressing the welded seam, it is believed that the tube should be compressed so that its minor diameter is approximately two-thirds or less of its original diameter.

Although the present invention has been described in connection with a particular embodiment thereof and with a particular apparatus for carrying out steps of the invention, those skilled in the art may devise other modifications and embodiments. It should be understood that the details of the described embodiment and apparatus are not intended to limit the scope of the invention except as set forth in the accompanying claims.

What is claimed as new and desired to be secured by Letters Patent of the United States is:

1. A method for treating tubing having a welded seam for rendering hidden defects in the weld capable of detection comprising shaping the tube so that it has an oval cross section and then twisting the tubing about its central longitudinal axis thereby to subject the welded seam to shear stress throughout its entire width.

2. The method of claim 1 further comprising repeatedly forming the tubing into oval shapes having transversely oriented major diameters prior to said shaping.

3. A process of treating tubing of the type formed by feeding a strip of metal into a tube mill, forming the strip into a substantially circular cylindrical shape, and bonding the edges of the strip together, said process comprising:

advancing the tubing through the tube mill after said bonding;

and twisting the tubing while it is being advanced thereby to subject the bonded edges of the strip to shearing forces effective to open up regions where the bonding is defective.

4. The process of claim 3 wherein said twisting is accomplished by rotating the tubing wall about the tubing axis.

5. The process of claim 4 wherein said tubing wall is rotated through at least approximately 90 degrees as said tubing is advanced a distance of approximately one to two feet.

6. The process of claim 3 further comprising shaping the advancing tube into an oval shape prior to said twisting, and returning said tubing to a substantially circular cylindrical shape after said twisting.

7. The process of claim 3, additionally comprising:
forming the tubing into an oval shape as it is advanced and prior to said twisting;
said twisting being accomplished by rotating the tubing wall about its axis as the tubing advances.

8. The process of claim 7 further comprising:
prior to said forming, shaping the tubing into an oval shape with its major axis disposed in one direction relative to the tubing wall;
and shaping the tubing into an oval shape with its major axis transverse to said one direction.

References Cited

UNITED STATES PATENTS

| 2,346,376 | 4/1944 | Heavener | 72—371 |
| 3,075,484 | 1/1963 | Benteler | 29—480 |
| 2,984,100 | 5/1961 | Reynolds | 73—88 |

LOWELL A. LARSON, Primary Examiner

U.S. Cl. X.R.

29—480; 72—368